US012689818B2

(12) United States Patent
Singh et al.

(10) Patent No.: US 12,689,818 B2
(45) Date of Patent: Jul. 21, 2026

(54) ARTIFICIAL INTELLIGENCE BASED VIDEO OPTIMIZATION FOR MONITORING SYSTEM

(71) Applicant: Arlo Technologies, Inc., Carlsbad, CA (US)

(72) Inventors: Rajinder Singh, San Jose, CA (US); John Thomas, Carlsbad, CA (US); Vince Smith, Langley (CA)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 18/911,364

(22) Filed: Oct. 10, 2024

(65) Prior Publication Data

US 2026/0107052 A1 Apr. 16, 2026

(51) Int. Cl.
| | |
|---|---|
| *H04N 23/61* | (2023.01) |
| *G06V 10/70* | (2022.01) |
| *G06V 20/40* | (2022.01) |
| *H04N 7/18* | (2006.01) |

(52) U.S. Cl.
CPC ........... *H04N 23/61* (2023.01); *G06V 10/768* (2022.01); *G06V 20/41* (2022.01); *G06V 20/44* (2022.01); *H04N 7/188* (2013.01)

(58) Field of Classification Search
None
See application file for complete search history.

(56) References Cited

U.S. PATENT DOCUMENTS

| | | | | |
|---|---|---|---|---|
| 8,248,226 | B2 | 8/2012 | Friar | |
| 11,369,321 | B2 * | 6/2022 | Kwan | G16H 40/20 |
| 11,508,234 | B1 | 11/2022 | Balamurugan et al. | |
| 11,902,656 | B2 | 2/2024 | Muthiah et al. | |
| 12,417,362 | B1 * | 9/2025 | Singh | G06K 1/14 |
| 2019/0246075 | A1 * | 8/2019 | Khadloya | H04N 7/183 |
| 2022/0405514 | A1 * | 12/2022 | Guzik | G06V 10/25 |
| 2023/0370710 | A1 * | 11/2023 | Xiong | H04N 23/631 |
| 2024/0402661 | A1 * | 12/2024 | Challa | G05B 13/027 |
| 2025/0064343 | A1 * | 2/2025 | Furst | G16H 50/30 |
| 2025/0184705 | A1 * | 6/2025 | Scott | H04W 68/06 |

FOREIGN PATENT DOCUMENTS

EP 4080467 A1 10/2022

* cited by examiner

*Primary Examiner* — Daniel T Tekle
(74) *Attorney, Agent, or Firm* — Boyle Fredrickson, S.C.

(57) ABSTRACT

An electronic monitoring system and method for monitoring an environment are provided. The electronic monitoring system includes at least one monitoring device configured to monitor a zone within the environment and selectively capture video streams in response to corresponding triggering events. A controller, including an AI algorithm, is configured to receive data from the at least one monitoring device relating to the monitored zone. Patterns are automatically identified and evaluated in the data received and a characteristic of a video stream to be captured is modified, at least partially, in response to the identified patterns in previously received data.

19 Claims, 9 Drawing Sheets

ARTIFICIAL INTELLIGENCE BASED VIDEO OPTIMIZATION FOR MONITORING SYSTEM

BACKGROUND OF THE INVENTION

1. Field of the Invention

The present invention relates generally to an electronic monitoring system, and in particular, to an electronic monitoring system and method that utilize an artificial intelligence (AI) algorithm to optimize the recordation and storage of videos taken in response to a triggering event.

2. Discussion of the Related Art

Modern electronic monitoring systems for the home typically include one or more smart security cameras having one or more imaging devices, each including a camera, such as a video recorder, and possibly also including a speaker and a microphone. The imaging device is configured to allow simultaneous video and audio communication to a user on a computing device.

The electronic monitoring system further includes a hub or base station that communicates with the imaging devices and one or more user devices such as a desktop computer, a laptop computer, a smartphone, or a tablet. The base station may also communicate with an external server, such as a cloud-based server. Computing and image processing are performed in a controller located, in whole or in part, in some combination of the imaging device(s), the base station, the server, and the user device(s).

The video supplied by the smart security cameras to the controller is provided by at least one of a plurality of available imaging devices positioned at different locations. The subject imaging device may be selected by default, based on user input, and/or automatically selected using artificial intelligence such as computer vision. Each imaging device is directed to a corresponding monitored area or "activity zone" within the imaging device's two-dimensional ("XY") visual field of view as defined by the field of view of the imaging device's camera. The activity zone typically contains an "area of interest" which may comprise the entire field of view of the imaging device but, more typically, comprises a portion of the field of view. A triggering event, most typically motion detection, in the monitored activity zone, triggers image capture and related functions. As a result of limiting the monitored area to an activity zone containing an area of interest, motion in the activity zone is detected and triggers image capture and related functions, whereas motion outside of the activity zone does not. This conditions image capture and related operations, including generation and transmission of alerts to users, to the occurrence of triggering events in an area of interest as defined by the activity zone, avoiding false alarms resulting from motion detection outside of the activity zone.

The imaging devices of electronic monitoring systems are normally configured to record a fixed length video in response to a triggering event. However, optimizing the length and storage of any videos taken by an imaging device presents various challenges for the electronic monitoring system. By way of example, coordination of the imaging devices of an electronic monitoring system in order to optimize and co-ordinate the video and audio taken by each of the imaging devices in response to a triggering event can be extremely complicated. In addition, determining the length of video necessary to capture the entirety of the triggering event, without capturing unnecessary footage, can be difficult. Further, given the costs associated with the processing and storage of the video, it is highly desirable to only capture and store the length of video absolutely necessary. Moreover, many cameras and/or imaging devices are battery powered. Hence, the size of the battery powering each camera/imaging device must be optimized to ensure the entirety of a triggering event is captured on video, but not unnecessarily increase the overall cost of the electronic monitoring system.

In view of the foregoing, it is a primary object and feature of the present invention to provide an improved electronic monitoring system and method that utilizes artificial intelligence (AI) based video optimization the facilitates the recording of a length of video necessary to capture the entirety of a triggering event, without capturing unnecessary footage.

It is a further object and feature of the present invention to provide an improved electronic monitoring system and method that utilizes artificial intelligence (AI) based video optimization that facilitates the recording of a length of video to optimize the storage and transmission thereof.

It is a still further object and feature of the present invention to provide an improved electronic monitoring system and method that utilizes artificial intelligence (AI) based video optimization that is simple and inexpensive to implement.

SUMMARY OF THE INVENTION

In accordance with an aspect of the present invention, an electronic monitoring system for monitoring an environment is provided. The electronic monitoring system includes at least one monitoring device configured to monitor a zone within the environment and selectively capture video streams in response to corresponding triggering events. A controller, including an AI algorithm, is configured to receive data from the at least one monitoring device relating to the monitored zone. Patterns are automatically identified and evaluated in the data received and a characteristic of a video stream to be captured is modified in response to the identified patterns in previously received data.

The characteristic of the video stream to be captured may be its length, such that the length of the video stream to be captured is modified in response to the identified patterns. It is contemplated for the controller to be configured to identify and evaluate the patterns in the data as a function of multiple triggering events that were previously detected by the system. Alternatively or in addition to, the controller may be configured to identify and evaluate the patterns in the data as a function of multiple video streams that were previously captured by the at least one monitoring device. For example, when each video stream captured includes a moving object having a speed, the controller may be configured to identify and evaluate the patterns in the data as a function of the speed of the moving object in the video streams previously captured by the at least one monitoring device. Further, when each video stream captured includes a moving object having a direction, the controller may be configured to identify and evaluate the patterns in the data as a function of the direction of the moving object in the video streams previously captured by the at least one monitoring device. When each video stream captured includes an object, such as person, having one of a known identity and an unknown identity, the controller may be configured to identify and evaluate the patterns in the data as a function of the identify of the object in the video streams previously captured by the at least one monitoring device.

In accordance with a further aspect of the present invention, an electronic monitoring system for monitoring an environment is provided. The electronic monitoring system includes at least one monitoring device configured to monitor a zone within the environment and selectively capture video streams in response to corresponding triggering events. A controller including an AI algorithm is configured to receive data from the at least one monitoring device relating to the monitored zone and identify and evaluate patterns in the data received. A characteristic of a video stream to be captured is modified as a function of the data previously provided to the controller by the at least one monitoring device.

The characteristic of the video stream to be captured may be a length of the video stream such that the length of the video stream to be captured is modified as a function of the data previously provided to the controller by the at least one monitoring device. The data received by the controller may be defined by the triggering event. Alternatively, the data received by the controller may be the video stream. The video stream captured may include a moving object having a speed such that the controller is configured to identify and evaluate the patterns in the data as a function of the speed of the moving object in each video stream previously provided to the controller. When the video stream captured includes a moving object having a direction, the controller may be configured to identify and evaluate the patterns in the data as a function of the direction of the moving object in each video stream previously provided to the controller. When each video stream captured includes an object, such as a person, having one of a known identity and an unknown identity, the controller may configured to identify and evaluate the patterns in the data as a function of the identify of the object in the video streams previously provided to the controller.

In accordance with still further aspect of the present invention, a method for operating an electronic monitoring system is provided. The method includes the steps monitoring a zone within the environment and selectively capturing a video stream in response to a triggering event detected. Data relating to the monitored zone is provided and patterns in the data are automatically identified and evaluated. A characteristic of a video stream to be captured is modified as a function of the data previously provided.

The characteristic of the video stream to be captured may be at least one of a length, a resolution, and a bit-rate of the video stream. At least one of the length, the resolution, and the bit-rate of the video stream to be captured may be modified in response to the identified patterns. The data may include multiple triggering events that were previously detected and/or multiple video streams that were previously captured. When each video stream previously captured includes a moving object having a speed, the data may include the speed of the moving object in the video streams previously captured and/or the direction of the moving object in the video streams previously captured. When each video stream previously captured includes an object, e.g, a person, having one of a known identity and an unknown identity, the data includes the identify of the object in the video streams previously captured.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
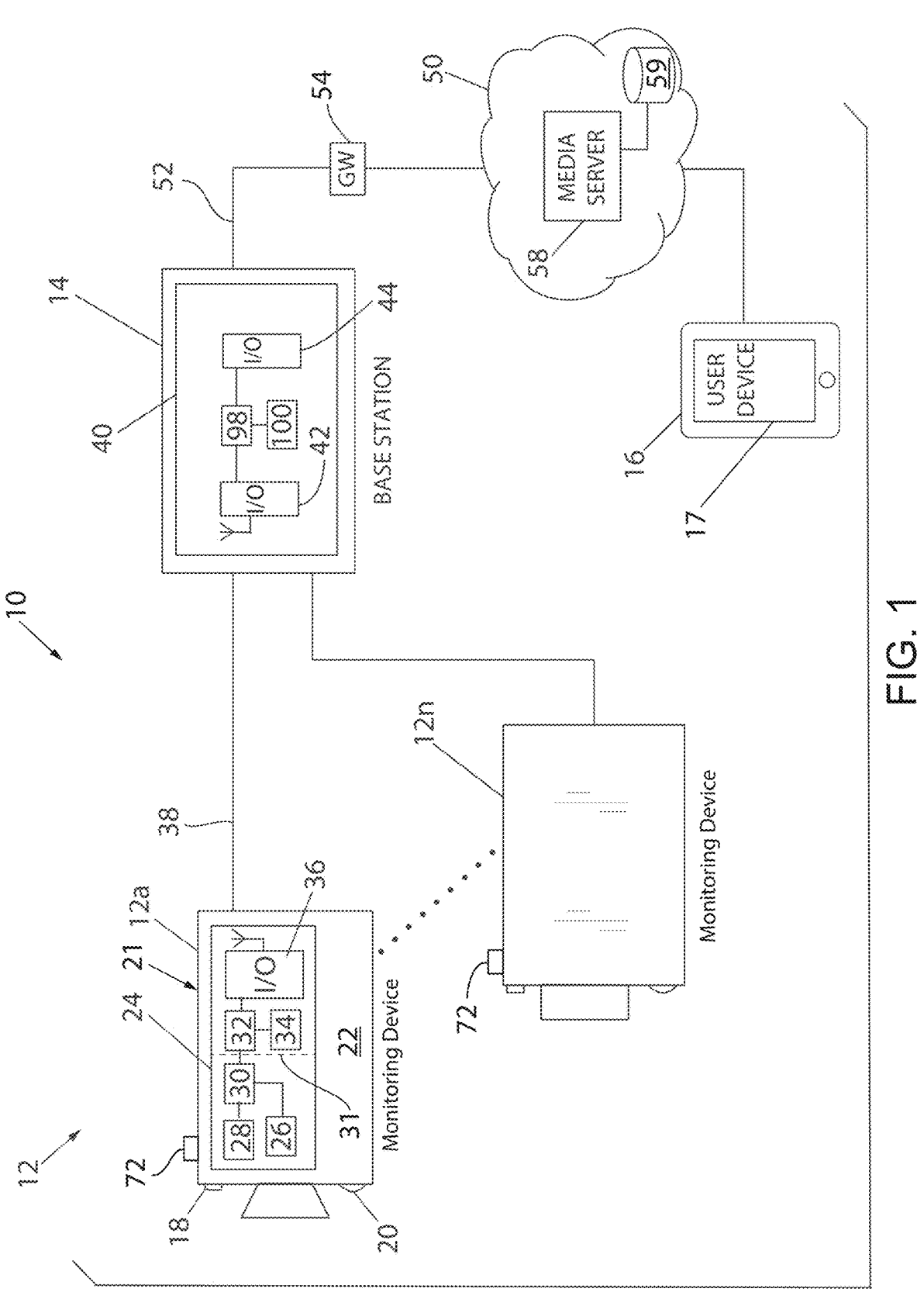
FIG. 1 is a schematic representation of a monitoring system according to aspects of the invention.

Referring now to FIG. 1, in accordance with an aspect of the invention, an electronic monitoring system 10 for real-time monitoring can include one or more monitoring devices 12 and a hub or base station 14. A number "n" 12a-12n of monitoring devices are schematically illustrated in FIG. 1. One or more user devices 16, such as a smart phone, tablet, laptop, or PC, communicate with the base station 14. Each user device 16 includes a display 17 that typically includes both an audio display and a video display, internal computing and storage capabilities, and a program or application servicing as a user interface with the remainder of the system 10. In the case of a smart phone, the display typically will include a touch screen and a speaker.

Unless otherwise specified, reference to a generic "monitoring device 12" shall apply equally to all monitoring devices 12a-12n. Each monitoring device 12 is configured to perform any of a variety of monitoring, sensing, and communicating functions, including acquiring data and to transmitting it to the base station 14 for further processing and/or transmission to a server and/or the user device(s) 16. Each monitoring device 12 may be battery powered or wired. Several such monitoring devices may be mounted around a building or other structure or area being monitored. For example, in the case of a residential home, monitoring devices 12 could be mounted by each entrance, selected windows, and even on a gate or light pole. A monitoring device 12 also could be incorporated into or coupled to a doorbell, floodlight, etc. The monitoring devices 12 may comprise any combination of devices capable of monitoring a designated area such as a home, office, industrial or commercial building, yard, parking or storage lot, etc. Each individual monitoring device may monitor one or a combination of parameters such as motion, sound, temperature etc. One or more of the individual monitoring devices 12 may be or include still or video cameras, temperature sensors, microphones, motion sensors, etc. At least one such monitoring device, designated by reference numeral 12a in FIG. 1, is an imaging device described in more detail below. The data acquired by each imaging device, e.g. imaging device 12a, typically will correspond to an audio file and a video image, and each imaging device 12a may be or include a camera such as a video camera 21.

Still referring to FIG. 1, as labeled on imaging device 12a, one or more of the imaging devices may also include a microphone 18, visible and/or infrared (IR) lights 20, a power supply 22, such as a battery or battery pack, and/or imaging device electronic circuitry 24. Circuitry 24 may include one or more imagers 26, an audio circuit 28, a media encoder 30, a controller 31 including processor 32 and non-transient memory storage 34, and/or a wireless I/O communication device 36, among other things.

Still referring to FIG. 1, each monitoring device 12 can communicate with the base station 14 through a network 38. It is contemplated that the network 38 may be in whole or in part a wired network, a wireless network, or a combination thereof. The network 38 may include a private Wireless Local Area Network (WLAN) 38, hosted by the base station 14 operating as an access point. One such network is an IEEE 802.11 network. The hub or base station 14 can include base station electronic circuitry 40 including a first wireless I/O communication device 42 for communicating with the monitoring devices 12 over the WLAN 38, a second wired or wireless I/O communication device 44 for accessing a Wide Area Network (WAN) 50, such as the Internet through a Local Area Network (LAN) 52 connected to a gateway and/or router 54, a processor 98 and/or a non-transient memory storage 100, among other things. The base station 14 also could be combined with a gateway router 54 or another device or a combination devices in a single module or connected modules, which would still be considered a "base station" within the meaning of the present disclosure. It should be apparent that "circuitry" in the regard can comprise hardware, firmware, software, or any combination thereof.

Instead of or in addition to containing a video camera 21 or other imaging device, one or all of the monitoring devices 12 may include one or more sensors configured to detect one or more types of conditions or stimulus, for example, motion, opening or closing events of doors or windows, sounds such as breaking glass or gunshots, the presence of smoke, carbon monoxide, water leaks, and temperature changes. The monitoring devices 12 may further include or be other devices such as audio devices, including microphones, sound sensors, and speakers configured for audio communication or providing audible alerts, such as Arlo Chime audible devices. The imaging devices 12a or cameras 21, sensors, or other monitoring devices 12 also may be incorporated into form factors of other house or building accessories, such as doorbells, floodlights, etc., each which may be available on a stand-alone basis or as part of any of a number of systems available from Arlo Technologies, Inc. of Carlsbad, California.

Still referring to FIG. 1, the base station 14 may also be in communication with a server 58, which may be a cloud-server accessible via the WAN 50. As is conventional, server 58 includes memory 59 and can include or be coupled to a microprocessor, a microcontroller or other programmable logic element (individually and collectively considered "a controller") configured to execute a program. Alternatively, interconnected aspects of the controller and the programs executed by it could be distributed in various permutations within the monitoring device 12, the base station 14, the user device 16, and the server 58. This program, while operating at the server level, may be utilized in filtering, processing, categorizing, storing, recalling and transmitting data received from the monitoring devices 12 via the base station 14.

Figure 2:
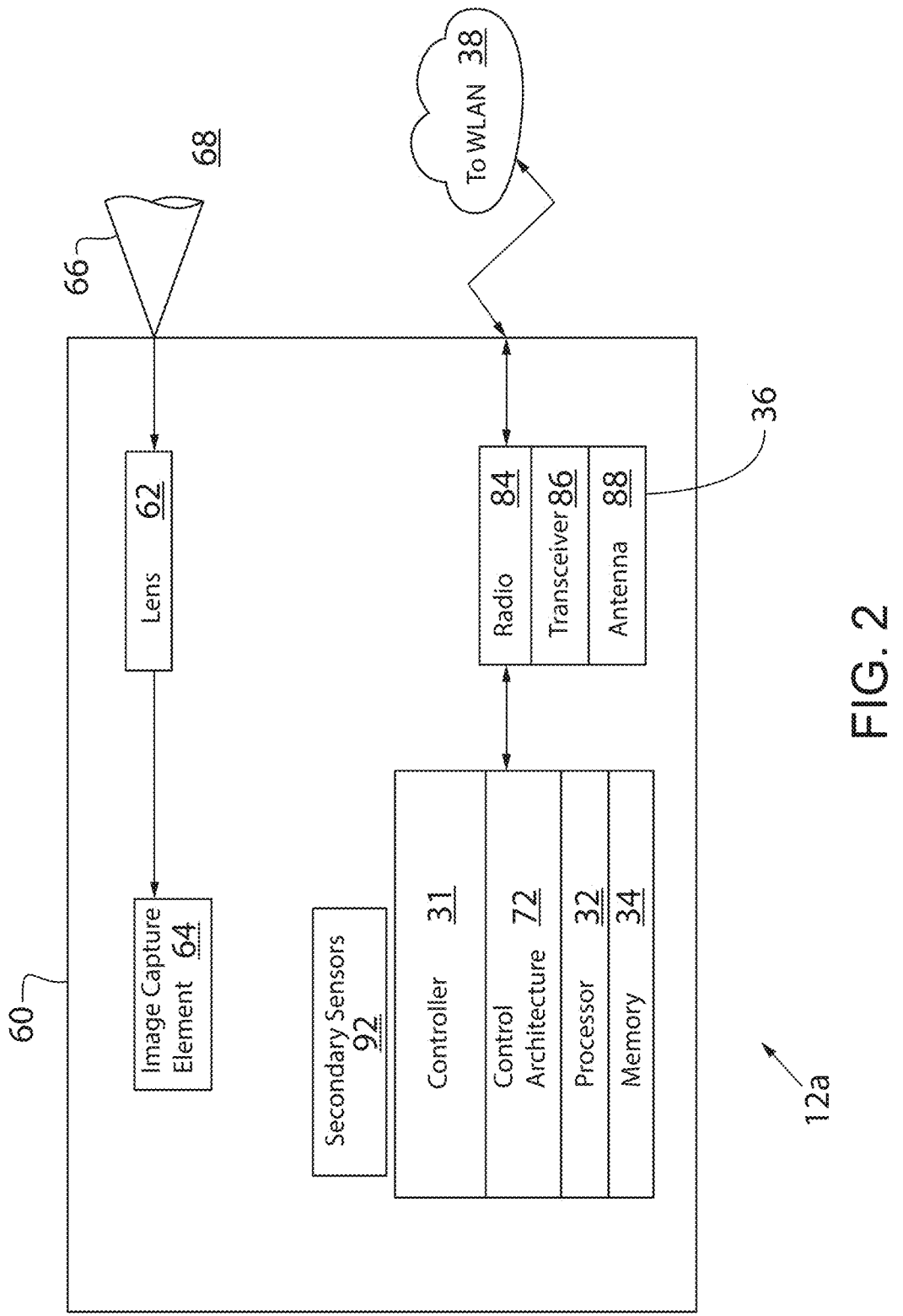
FIG. 2 is a block diagram representing an imaging device shown in FIG. 1.

FIG. 2 represents an example of imaging device 12a shown in FIG. 1. In the illustration, the imaging devices 12a has a small and compact housing 60 for enclosing and protecting the various camera components illustrated as blocks in FIG. 2. The imaging device 12a includes a lens 62 and an image capture element (or primary sensor) 64. The image capture element 64 can be any suitable type of image capturing device or sensor; including, for example, an area array sensor, a Charge Coupled Device (CCD) sensor, a Complementary Metal Oxide Semiconductor (CMOS) sensor, or a linear array sensor, just to name a few possibilities. The image capture element 64 may capture images in suitable wavelengths on the electromagnetic spectrum. The image capture element 64 may capture color images and/or grayscale images.

The imaging device 12a has a field of view 66 extending radially from the outwardly facing lens 62. The field of view 66 is a portion of the environment 68 within which the imaging device 12a can detect electromagnetic radiation via the lens 62 and image capture element 64. The imaging device 12a is configured to capture images. An image is a digital representation of a scene for the environment 68 as captured by the imaging device 12a. Capturing an image refers to the act of obtaining and recording an image data file or stream of the digital representation. The scene is the portion of the environment 68 observed through the field of view 66. Capturing a plurality of images in a timed sequence can result in a video. Capturing a video refers to the act of obtaining and recording a video data file or stream of the digital representation.

Still referring to FIG. 2, as noted above, the imaging device 12a includes controller 31 having a processor 32 and non-transient memory 34. It is contemplated for controller 31 to have multiple processors, such as dual processors, and accompanying memory without deviating from the scope of the present invention. Processor 32 can include any component or group of components that are configured to execute, implement, and/or perform any of the processes or functions described herein or any form of instructions to carry out such processes or cause such processes to be performed. Examples of suitable processors include a microprocessor, microcontroller, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processor 32 can include a hardware circuit (e.g., an integrated circuit) configured to carry out instructions contained in program code.

Memory 34 stores one or more types of instructions and/or data. Memory 34 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. Memory 34 can be a component of a processor, can be operatively connected to a processor for use thereby, or a combination of both. Memory 34 can include various instructions stored thereon. More specifically, it is intended for memory 34 to store an artificial intelligence (AI) algorithm for calculation, data processing, and automated reasoning. As hereinafter described, the AI algorithm allows controller 31 to utilize the data received by the controller to identify patterns, trends, correlations and/or clusters within the data to learn and make decisions without explicit programming. More specifically, it is intended for the AI algorithm to automatically identify and evaluate patterns and trends in the data received, namely, the triggering events, as well as, the raw audio and video streams, to optimize the capture, storage and transmission of the audio and video streams, as hereinafter described.

Further, memory 34 may store one or more modules. Modules can be or include computer-readable instructions that, when executed by a processor, cause a processor to perform the various functions disclosed herein. While functions may be described herein for purposes of brevity, it is noted that the functions are performed by the controller 31 using the instructions stored on or included in the various modules described herein. Some modules may be stored remotely and accessible by a processor using, for instance, various communication devices and protocols.

The imaging device 12a typically communicates wirelessly (e.g., with the base station 14) via an input/output communication device 36, such as a radio 84. An example of a radio includes a wireless local area network (WLAN) radio. With the WLAN radio 84, the imaging device 12a generally communicates over a short-range wireless communication network, such as the WLAN 38. In one implementation, the radio 84 includes a transceiver 86 for transmitting and receiving signals to and from the base station 14, via an antenna 88. The transceiver 86 can be separate from or part of the control architecture 72. The wireless communication can be as prescribed by the IEEE 802.11 standards in accordance with the Wi-Fi™ communication protocol. It is appreciated, however, that the imaging device 12a can be adapted to perform communications in accordance with other known or to be developed communication protocol, or even a proprietary communication protocol developed for a particular application. Also, while only a single transceiver 86 and single antenna 88 is shown, multiple transceivers and multiple antennas can be used to communicate at multiple communication frequency bands. Alternatively, the single transceiver 86 and the single radio 84 can communicate over multiple frequency bands.

The imaging devices 12a can further include secondary sensors 92. For example, a secondary sensor 92 may be a microphone, a motion sensor, a temperature sensor, an image sensor, and a vibration sensor. An exemplary camera capable of incorporating aspects of the invention is an Arlo Ultra brand camera available from Arlo Technologies in Carlsbad, California, US. Before moving to other components of the system 10, it should be understood by somebody skilled in the art that the imaging devices 12a includes many additional conventional components typically found in a wireless camera. Further discussion regarding these components is not provided herein since the components are conventional.

It is intended for each monitoring device 12 to be configured, through suitable mounting of the monitoring device 12 and/or through suitable manipulation of its controls, to monitor an area of interest, such as a part of a building or section of property or a monitored zone. Imaging device 12a may capture an image automatically upon detection of a triggering event and/or upon receipt of a command from a user device 16. Alternatively, an image also may be captured automatically upon detection of a triggering event detected by a detector. Whether monitoring device 12 is an imaging device 12a or some other device, the triggering event may be motion, and the detector may be a motion detector. Instead of or in addition to detecting motion, the detector could include an IR sensor detecting heat, such as the body heat of an animal or person. The triggering event also could be sound, in which case the detector may include the microphone 18. In this case, the triggering event may be a sound exceeding a designated decibel level or some other identifiable threshold. Upon receiving notification from a monitoring device 12 of a triggering event, the system 10 can generate an alert such as a push notification ("PN") and send it to one or more user devices 16 for indicating the triggering event.

In the case of the monitoring device being an imaging device 12a having a camera, whether camera operation is triggered by a command from a user device 16 or by detection of a triggering event, the camera 21 can then capture a raw video stream which, in turn, can be provided to the media encoder 30 for producing video packets in an encoded video stream. Similarly, the microphone 18 and the audio circuit 28 can capture a raw audio stream which, in turn, can be provided to the media encoder 30 for producing audio packets in an encoded audio stream. Accordingly, the video and/or audio packets, referred to herein as "media" packets, are provided in an encoded media stream.

The media stream may then be transmitted via the WAN 50 to memory 59 in communication with a media server 58 for data storage and processing. Memory 59 may be a cloud-based storage device, and the media server 58 may be a cloud server accessible via a wireless connection. A filtered or otherwise processed image can then be displayed on the user device 16, along with additional visual and/or audio messaging such as a text and/or audio message identifying a generic or particular person or object.

Figure 3:
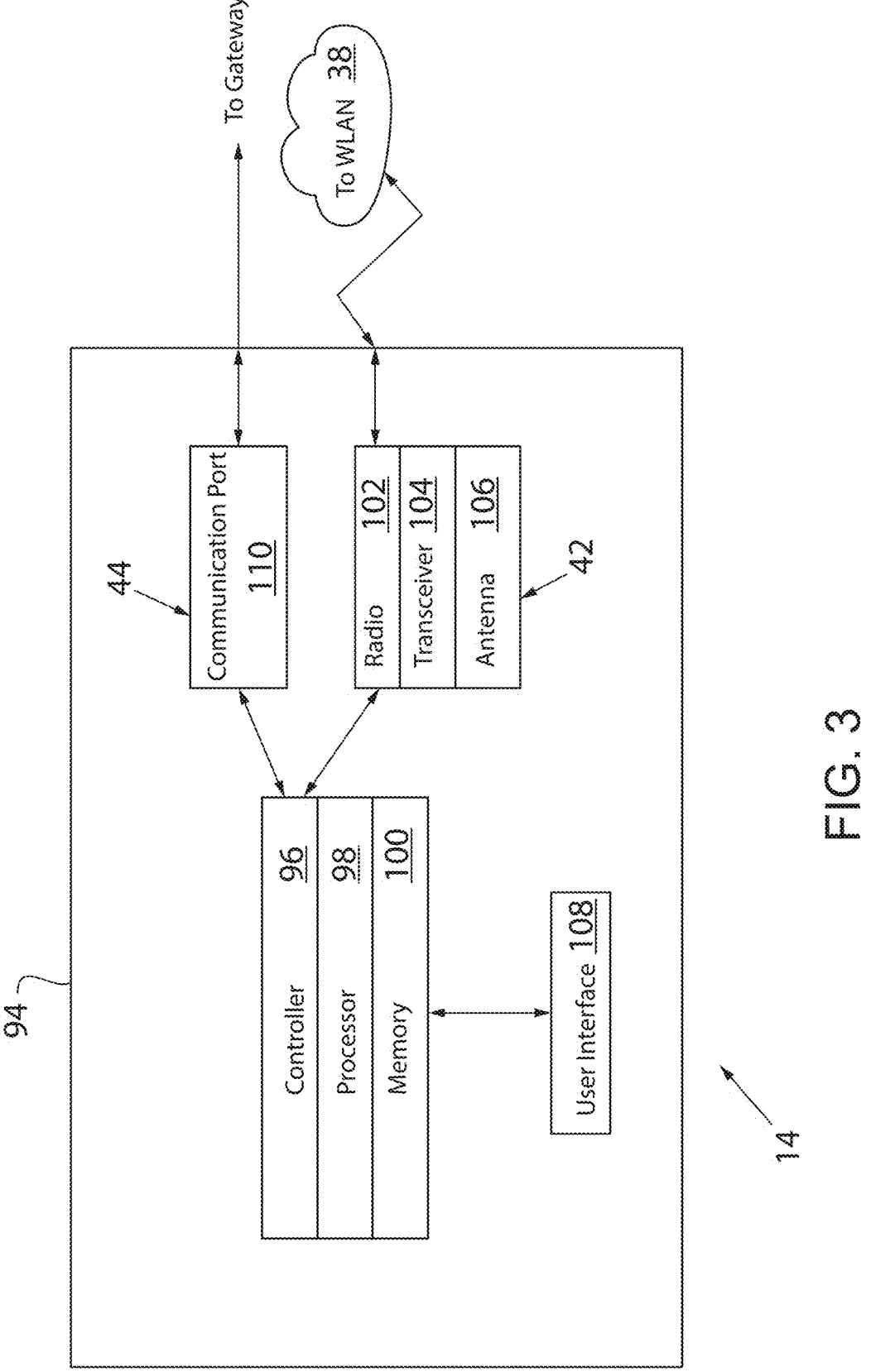
FIG. 3 is a block diagram representing a base station shown in FIG. 1.

Turning now to FIG. 3, the figure represents an example of the base station 14 shown in FIG. 1. In the illustration, the base station 14 has a housing 94 for enclosing and protecting the various components illustrated as blocks in FIG. 3. The base station 14 has a controller 96, including a processor 98 and a memory 100. While the arrangement of FIG. 3 shows a single processor 98 and a single memory 100, it is envisioned that many other arrangements are possible. For example, multiple elements of the base station 14 can include a distinct processor and memory. The processor 98 can include a component or group of components that are configured to execute, implement, and/or perform any of the processes or functions described herein for the base station 14 or a form of instructions to carry out such processes or cause such processes to be performed. Examples of suitable processors include a microprocessor, a microcontroller, and other circuitry that can execute software. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry. The processor 98 can include a hardware circuit (e.g., an integrated circuit) configured to carry out instructions contained in program code. In arrangements in which there are a plurality of processors, such processors can work independently from each other, or one or more processors can work in combination with each other.

Still referring to FIG. 3, the base station 14 includes a memory 100 for storing one or more types of instructions and/or data. Memory 100 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. Memory 100 can be a component of the processor 98, can be operatively connected to the processor 98 for use thereby, or a combination of both. The controller 96 can include various instructions stored thereon. For example, the controller 96 can store one or more modules. Modules can be or include computer-readable instructions that, when executed, cause the processor 98 to perform the various functions disclosed for the module. While functions may be described herein for purposes of brevity, it is noted that the functions are performed by the processor 98 or another portion of controller 96 using the instructions stored on or included in the various modules. Some modules may be stored remotely and accessible by the processor 98 or another portion of the controller using, for instance, various communication devices and protocols.

Still referring to FIG. 3, the base station 14 typically communicates wirelessly (e.g., with the imaging devices 12) via communication device 42, e.g., radio 102. An example of a radio includes a wireless local area network (WLAN) radio. With the WLAN radio 102, the base station 14 generally communicates over a short-range wireless communication network, such as the WLAN 38. In one implementation, the radio 102 includes a transceiver 104 for transmitting and receiving signals to and from the base station 14, via an antenna 106. The transceiver 104 can be separate to or part of the controller 96. The wireless communication can be as prescribed by the IEEE 802.11 standards in accordance with the Wi-Fi™ communication protocol. It is appreciated, however, that the base station 14 can be adapted to perform communications in accordance with other known or to be developed communication protocol, or even a proprietary communication protocol developed for a particular application. Also, while only a single transceiver 104 and single antenna 106 is shown, multiple transceivers and multiple antennas can be used to communicate at multiple communication frequency bands. Alternatively, the single transceiver 104 and the single radio 102 can communicate over multiple frequency bands.

The base station 14 includes the user interface 108. The user interface 108 can include an input apparatus and an output apparatus. The input apparatus includes a device, component, system, element, or arrangement or groups thereof that enable information/data to be entered into the base station 14 from a user. The output apparatus includes any device, component, or arrangement or groups thereof that enable information/data to be presented to the user. The input apparatus and the output apparatus can be combined as a single apparatus, such as a touch screen commonly used by many electronic devices. The base station 14 includes a communication device 44, e.g., communication port 110, which is configured to provide a communication interface between a larger computer network, such as the Internet via the gateway.

In one construction, since the base station 14 is powered by an enduring power source (e.g., power outlet), it is not necessary for the base station 14 to be operated in a default sleep mode, although this is not precluded. An exemplary base station capable of incorporating aspects of the invention is an Arlo SmartHub brand base station available from Arlo Technologies in Carlsbad, California, US. Before moving to the operation of the system 10, it should be well understood by somebody skilled in the art that the base station 14 includes many additional conventional components typically found in a base station or access point.

Figure 4:
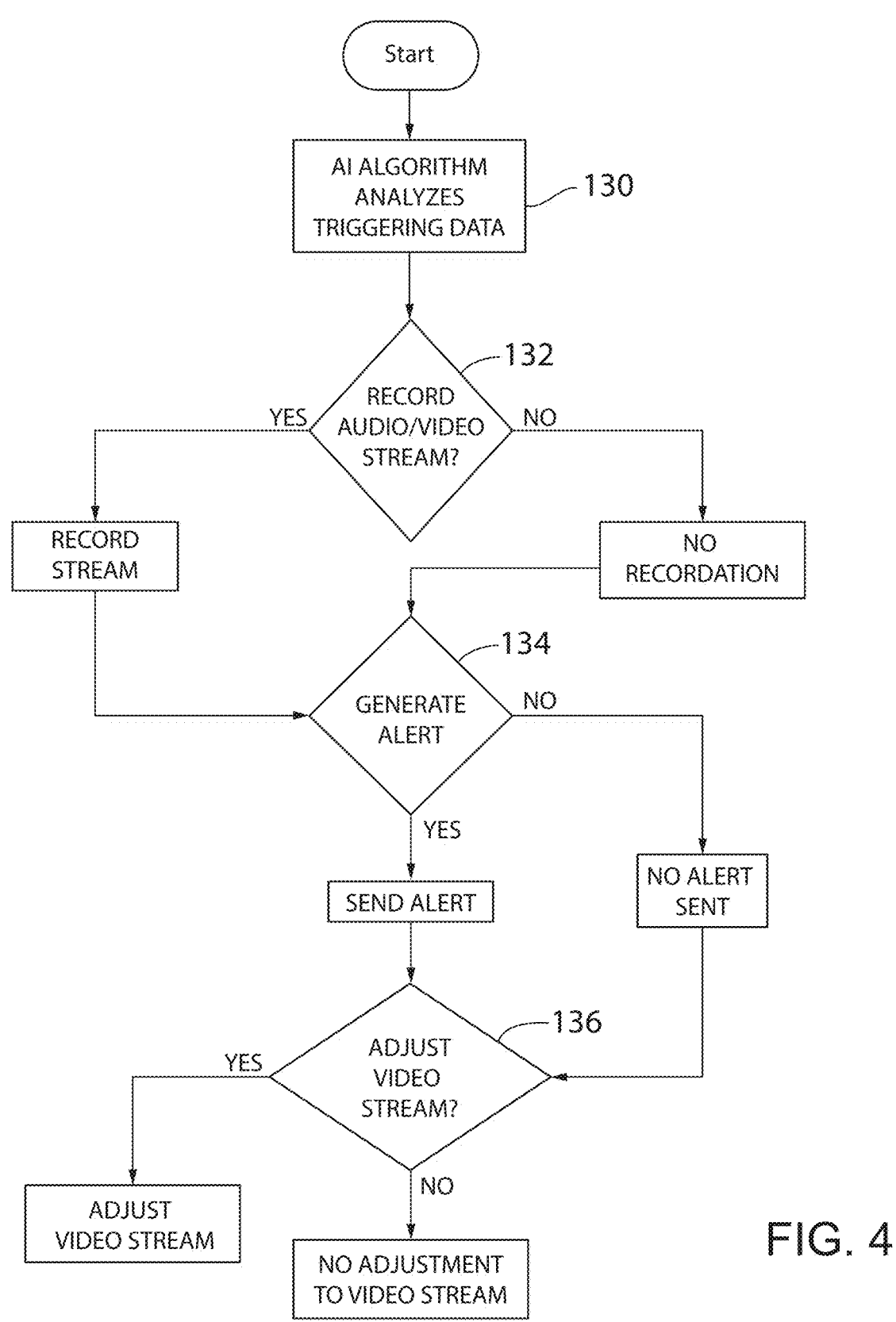
FIG. 4 is a flowchart showing a first portion of an AI algorithm operating at a monitoring device within the system.

Referring to FIG. 4, in response to detection of a triggering event, the AI algorithm executed by controller 31 utilizes the data corresponding to the triggering event received by controller 31 to identify patterns, trends, correlations and/or clusters within the data to learn and make decisions without explicit programming, block 130. Initially, the AI algorithm determines if the current triggering event provides a basis for recording an audio and/or video stream of the triggering event, block 132, and generating an alert such as a push notification ("PN") to send to one or more user devices 16 for indicating the triggering event, block 134. For example, the AI algorithm may analyze the triggering event to determine if the current triggering event is same as a prior triggering event, so as to determine if an additional audio and/or video stream should be recorded.

Similarly, if the triggering event constitutes a regular occurrence, e.g. church bells tolling daily at noon, the AI algorithm may identify a pattern and determine the ringing of the church bells should not constitute a triggering event, thereby preventing imaging device 12a from recording an audio and/or video stream in response to the triggering event and controller 31 from generating an alert such as a push notification ("PN") to send to one or more user devices 16 indicating the triggering event.

Further, it is contemplated for the AI algorithm executed by controller 31 to utilize the data corresponding to the triggering event received by controller 31 to detect patterns in the triggering events detected by monitoring device 12 over time and to utilize these patterns to determine: the length of the raw audio and video streams; the resolution of the video streams (e.g. the AI algorithm may determine a higher resolution video may be needed for selected triggering events and a lower resolution video in other circumstances); and/or the bit-rate or other characteristics of the audio and video streams to be recorded based on the triggering event type, block 136. In other words, the AI algorithm executed by controller 31 may adjust the length of the raw audio and video streams, the resolution of the video streams and/or the bit-rate or other characteristics of the audio and video streams to be recorded by imaging device 12a based upon the volume and suddenness of the triggering event detected. For example, in the case of a triggering event generated by a gun shot or glass break, the AI algorithm executed by controller 31 may lengthen the raw audio and video stream and the resolution of the video stream to be captured by imaging device 12a in response to such a triggering event as compared to a triggering event generated by a car horn, etc.

Figure 5:
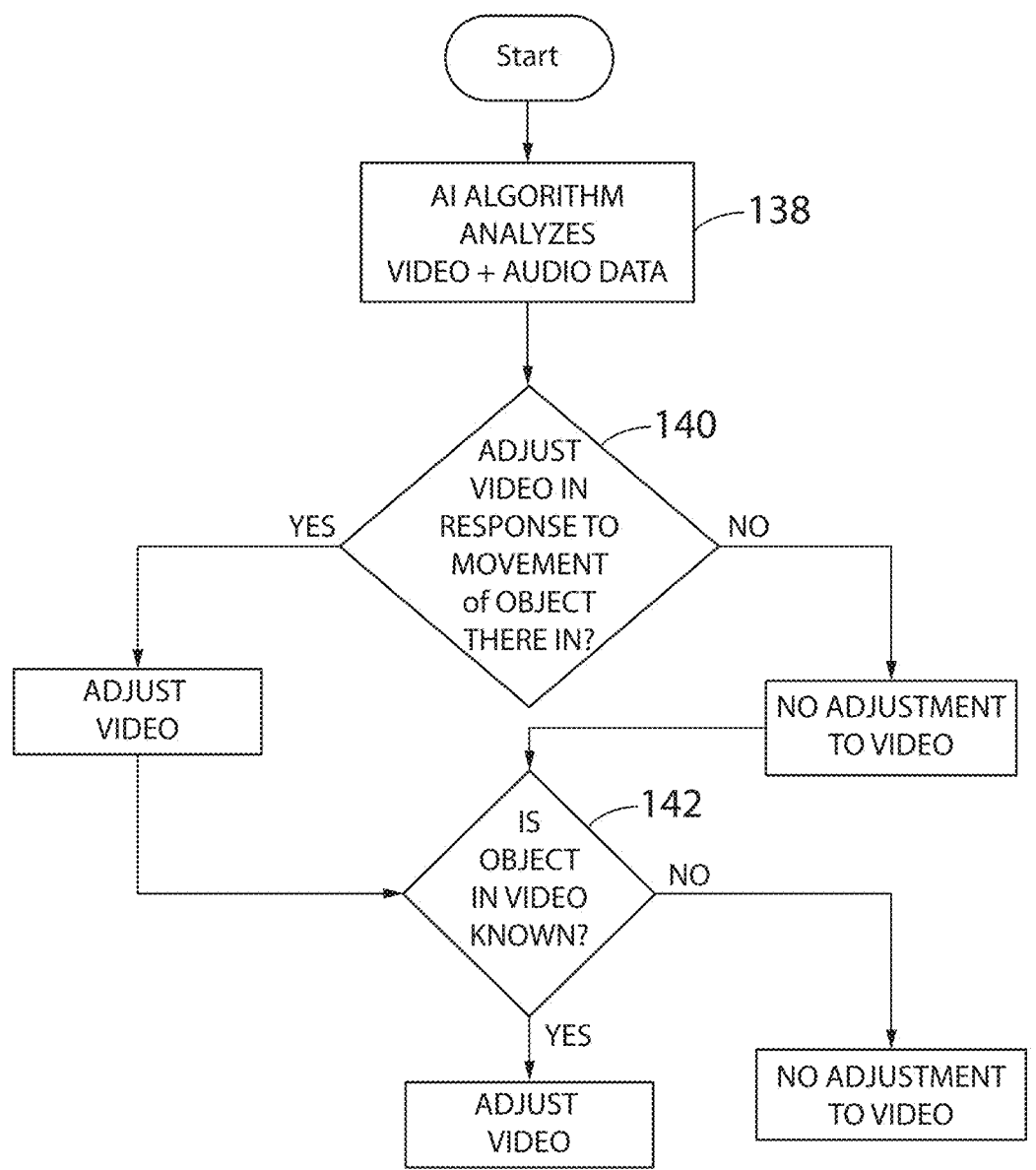
FIG. 5 is a flowchart showing a second portion of the AI algorithm operating at the monitoring device within the system.

Referring to FIG. 5, additionally, it is contemplated for the AI algorithm executed by controller 31 of imaging device 12a to analyze each raw audio and video stream captured by imaging device 12a to identify patterns, trends, correlations and/or clusters within the data to learn and make decisions without explicit programming, block 138. In the case of triggering events generated by moving objects, the AI algorithm executed by controller 31 of imaging device 12a to analyze each raw video stream captured by imaging device 12a to determine the speeds and directions of moving objects (vehicle, person, animal etc.) within the activity zone and utilized such data to learn and make adjust the length of the future raw audio and video streams and the resolution of future video streams to be recorded by imaging device 12a in response to triggering events generated by moving objects. More specifically, the AI algorithm executed by controller 31 may determine if a future video stream should be recorded and the length of the video stream in response to the speeds and directions of moving objects in an activity zone in prior video streams, block 140. For example, the AI algorithm executed by controller 31 may cause imaging device 12a to capture future video streams having a high resolution from objects moving towards imaging device 12, but not capture video streams from objects moving away from imaging device 12. Similarly, if imaging device 12a is installed facing a busy street, the AI algorithm executed by controller 31 may cause imaging device 12a to only capture videos streams of objects moving slowly through the activity zone.

It is further contemplated for AI algorithm executed by controller 31 of imaging device 12a to analyze each raw video stream captured by imaging device 12a and utilized such data to learn and make adjustments to the length of future raw audio and video streams, the resolution of the video streams, and/or the bit-rate or other characteristics of the video streams to be recorded by imaging device 12a in response to the existence of known and/or unknown objects and/or persons within the activity zone, block 142. For example, in the case of triggering events generated by objects and/or persons within the activity zone, the AI algorithm may utilize computer vision program ("CV"), or facial detection module, stored in memory 34 or accessible by controller 31 of imaging device 12a, to analyze each raw video stream captured by imaging device 12a to determine if the objects and/or persons within the activity zone are known and utilized such data to learn and make adjust the length of the future raw audio and video streams to be recorded by imaging device 12a. More specifically, the AI algorithm executed by controller 31 may cause imaging device 12a to limit the length of video streams wherein objects and/or persons within the activity zone are known, but cause imaging device 12a to increase the length and/or the resolution of video streams including unknown objects and/or persons within the activity zone.

Figure 6:
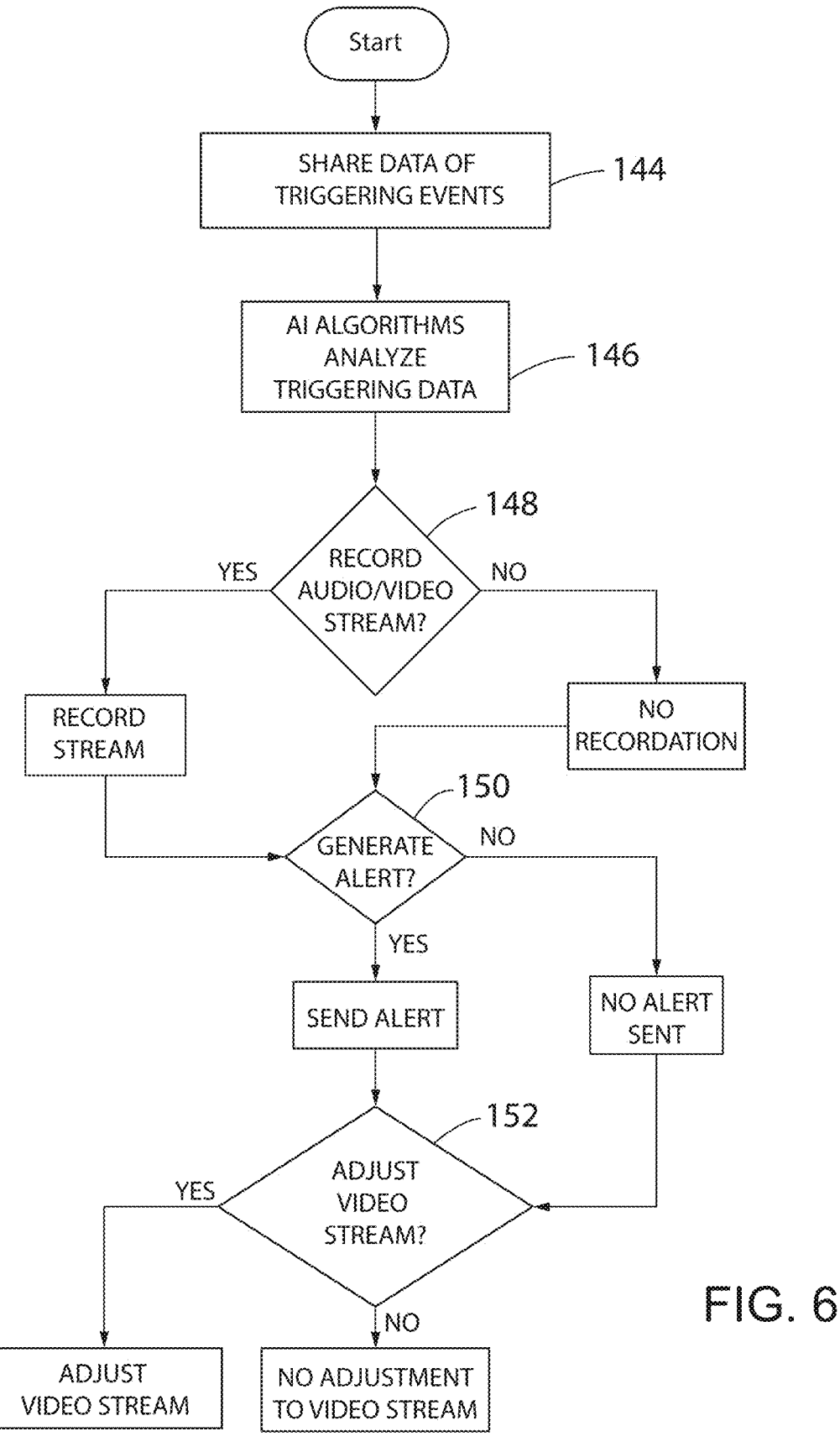
FIG. 6 is a flowchart showing a first portion of an AI algorithm operating at the base station within the system.

Referring to FIG. 6, it is further contemplated for each monitoring device 12 and/or imaging devices 12a to communicate with each other over WLAN 38, thereby allowing the AI algorithms of monitoring devices 12 and/or imaging devices 12 to share the data received by each monitoring device 12 and/or imaging devices 12a and to coordinate their analysis of the patterns and trends of the data received by each monitoring device 12 and/or imaging devices 12a, block 144. As a result, the AI algorithms of each monitoring device 12 and/or imaging devices 12a may act in unison to optimize the capture, storage and transmission of the audio and video streams within electronic monitoring system 10.

By way of example, it is contemplated the AI algorithms executed by controllers 31 of monitoring devices 12 and/or imaging devices 12 may communicate with each other and utilize the data corresponding to triggering events received by controllers 31 of a corresponding monitoring devices 12 and/or imaging devices 12a to identify patterns, trends, correlations and/or clusters within the data to learn and make decisions without explicit programming, block 146. As such, the AI algorithms may determine if a current triggering event provides a basis for recording an audio and/or video stream of the triggering event, block 148, and for generating an alert such as a push notification ("PN") to send to one or more user devices 16 for indicating the triggering event, block 150. For example, based on the triggering event sensed by one of monitoring devices 12 and/or imaging devices 12a, the AI algorithms may determine if the current triggering event is same as a prior triggering event or the same as a triggering event detected by a different monitoring device 12 and/or imaging device 12a and thereby to determine if an additional audio and/or video stream should be recorded.

Similarly, if the triggering event constitutes a regular occurrence, e.g. church bells tolling daily at noon, the AI algorithms may identify a pattern and determine the ringing of the church bells should not constitute a triggering event, thereby preventing each imaging device 12a from recording an audio and/or video stream in response to the triggering event and prevent any of processors 32 of monitoring devices 12 and/or imaging devices 12a from generating an alert such as a push notification ("PN") to send to one or more user devices 16 indicating the triggering event.

Further, it is contemplated for the AI algorithms executed by controllers 31 of monitoring devices 12 and/or imaging devices 12a to utilize the data corresponding to triggering events received by one of controllers 31 of monitoring devices 12 and/or imaging devices 12a to detect patterns in the triggering events detected by the monitoring devices 12 and/or imaging devices 12a over time and to utilize these patterns to determine the length of the raw audio and video streams; the resolution of the video streams; and/or the bit-rate or other characteristics of the audio and video streams to be recorded by each imaging based on the types of triggering events, block 152. In other words, the AI algorithms executed by controllers 31 may act in conjunction to adjust the length of the raw audio and video streams the length of the raw audio and video streams; the resolution of the video streams; and/or the bit-rate or other characteristics of the audio and video streams to be recorded by an imaging device 12a based upon the volume and suddenness of the audio detected by one or more of monitoring devices 12 and/or imaging devices 12a.

Figure 7:
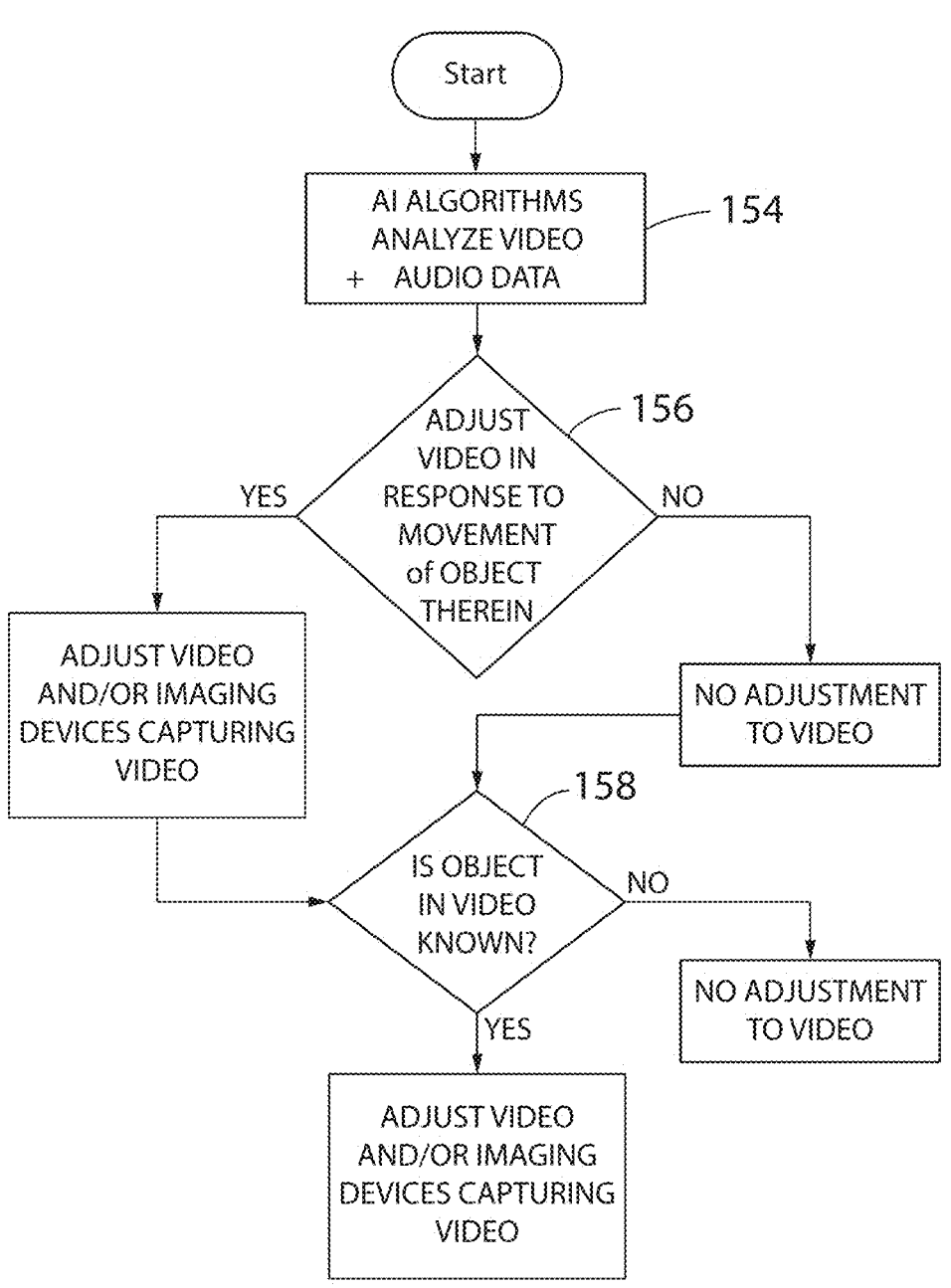
FIG. 7 is a flowchart showing a second portion of the AI algorithm operating at the base station within the system.

In addition, referring to FIG. 7, it is contemplated for the AI algorithms executed by processors 32 of monitoring devices 12 and/or imaging devices 12a to analyze each raw audio and video stream captured by monitoring devices 12 and/or imaging devices 12a to identify patterns, trends, correlations and/or clusters within the data to work together to learn and make decisions without explicit programming, block 154. In the case of triggering events generated by moving objects, the AI algorithms executed by controllers 31 of monitoring devices 12 and/or imaging devices 12a may analyze each raw video stream captured by imaging device 12a to determine the speeds, directions and locations of moving objects (vehicle, person, animal etc.) within the activity zone and utilize such data to learn and make adjust which one or more of imaging devices 12a are in the best position to take a future raw audio and video stream in response to a triggering event generated by a moving object; and to determine the length of the future raw audio and video streams, the resolution of the video streams, and/or the bit-rate or other characteristics of the audio and video streams to be recorded by the one or more imaging devices 12a in response to a triggering event generated by a moving object, block 156. More specifically, the AI algorithms executed by controllers 31 of monitoring devices 12 and/or imaging devices 12a may collectively determine if a future video stream should be recorded, the length of the video stream, the resolution of the video stream, and/or the bit-rate or other characteristic of the video stream in response to the speed and direction of a moving object in an activity zone and which one or more imaging devices 12a takes records the video stream. For example, the AI algorithms executed by controllers 31 of monitoring devices 12 and/or imaging devices 12a may instruct only imaging device 12a closest to the triggering event (i.e., the moving object) to capture a video stream of the object or may instruct only those imaging devices 12a having an object is moving towards it to capture a video stream of the object. Likewise, the AI algorithms executed by processors 32 of monitoring devices 12 and/or imaging devices 12a may instruct only imaging device 12a wherein the moving object is its field of view to capture a video stream of the triggering event.

It is further contemplated for AI algorithms executed by controllers 31 of monitoring devices 12 and/or imaging devices 12a to collectively analyze each raw video stream captured by each imaging device 12a and utilized such data to learn and make adjustments to the length of future raw audio and video streams to be recorded by the one or more imaging device 12a in response to the existence of known and/or unknown objects and/or persons within the activity zone, block 158. For example, in the case of triggering events generated by objects and/or persons within the activity zone, the AI algorithms may utilize computer vision program ("CV"), or facial detection module, stored in memory 34 or accessible by processors 32 of monitoring devices 12 and/or imaging devices 12a to analyze each raw video stream captured by one or more imaging devices 12a to determine if the objects and/or persons within the activity zone of each raw video stream are known and to utilize such data to learn and make adjust the length of the future raw audio and video streams, the resolution of the future video streams and/or the bit-rate or other characteristics of the future video streams to be recorded by one or more imaging devices 12a. More specifically, the AI algorithms executed by controllers 31 of monitoring devices 12 and/or imaging devices 12a may: 1) instruct some or all of the imaging devices 12a not to capture a video stream if it is determined that the object and/or person within the activity zone is known; 2) cause some or all of imaging devices 12a to limit the length of video streams wherein objects and/or persons within the activity zone are known; or 3) cause some or all of imaging devices 12a to adjust the length of video streams, adjust the resolution of the video streams, and/or adjust the bit-rate or other characteristics of the video streams upon a determination of unknown objects and/or persons within the activity zone.

Figure 8:
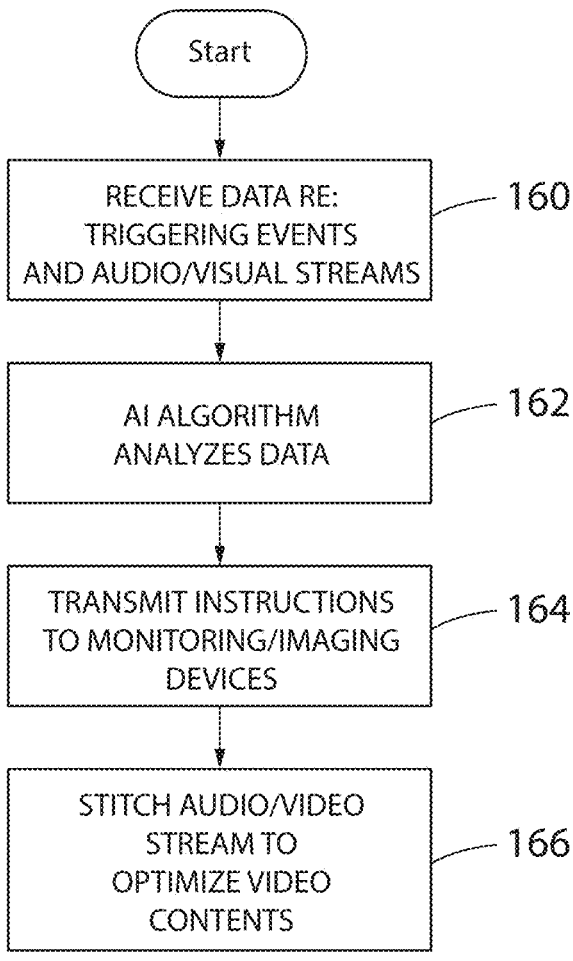
FIG. 8 is a flowchart showing a third portion of the AI algorithm operating at the base station within the system.

Referring to FIG. 8, in a further alternate configuration, it is contemplated for the AI algorithm to be stored in non-transient memory storage 48 of base station 14. In such arrangement, the data corresponding to triggering events received by controllers 31 of corresponding monitoring devices 12 and/or imaging devices 12a, as well as, each raw audio and video stream captured by monitoring devices 12 and/or imaging devices 12a are transmitted to base station 14, as heretofore described, block 160. Thereafter, the AI algorithm stored in non-transient memory storage 100 of base station 14 allows controller 96 of base station 14 to analyze the data received to identify patterns, trends, correlations and/or clusters within such data to learn and make decisions without explicit programming, block 162. More specifically, it is intended for the AI algorithm to automatically identify and evaluate patterns and trends in the data received, namely, the triggering events, as well as, the raw audio and video streams, to optimize the capture, storage and transmission of the audio and video streams, as heretofore described. Thereafter, the AI algorithm stored in non-transient memory storage 100 of base station 14 will forward instructions to corresponding monitoring devices 12 and/or imaging devices 12a regarding: 1) whether a current triggering event sensed by one or more monitoring devices 12 and/or imaging devices 12a provides a basis for recording an audio and/or video stream of the triggering event and generating an alert such as a push notification ("PN") to send to one or more monitoring devices 12 and/or imaging devices for the triggering event; 2) the length of the raw audio and video streams, the resolution of the video streams and/or the bit-rate or other characteristics of the video streams to be recorded by one or more monitoring devices 12 and/or imaging devices 12a based upon the volume and/or suddenness of the triggering event detected; 3) whether a future video stream should be recorded and the length of the video stream, the resolution of the future video streams and/or the bit-rate or other characteristics of the video stream to be recorded in response to the speed and direction of a moving object in an activity zone; and 4) the length of the future raw audio and video streams, the resolution of the future video streams and/or the bit-rate or other characteristics of the future video streams to be recorded by imaging device 12a if the objects and/or persons within the activity zone are known or unknown, block 164.

In addition, it is contemplated for the AI algorithm stored in non-transient memory storage 100 of base station 14 to utilize the data received from one or more monitoring devices 12 and/or imaging devices 12a to automatically stitch the data together to optimize the data transmitted to server 58 and/or user device 16, block 166. By way of example, the AI algorithm stored in non-transient memory storage 100 of base station 14 may stich together the raw audio and video streams captured by one or more imaging devices 12a to generate a single audio and video stream to optimize the length and contents thereof and to facilitate the storage and transmission thereof.

Figure 9:
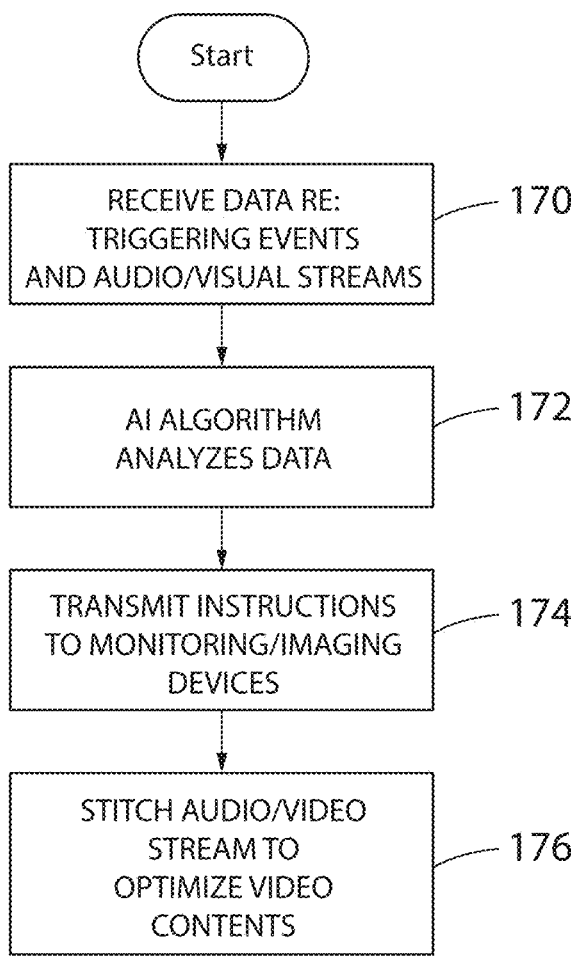
FIG. 9 is a flowchart showing an AI algorithm operating at a server within the system.

Referring to FIG. 9, in a still further alternative configuration, it is contemplated for the AI algorithm to be stored in memory on server 58. In such arrangement, the data corresponding to triggering events received by processors 32 of a corresponding monitoring devices 12 and/or imaging devices 12a, as well as, each raw audio and video stream captured by monitoring devices 12 and/or imaging devices 12a are transmitted to server 58, as heretofore described, block 170. In addition, it is contemplated for user device 16 to transmit data to server 58 corresponding to the behavior patterns of the user of user device 16. For example, an audio and/or video stream taken by a particular imaging device 12a may be reviewed frequently by a user, while the audio and/or video streams from other imaging devices 12a may be ignored. If an audio and/or video stream is reviewed frequently, it can be assumed that a user is particularly interested in viewing video streams from a particular imaging device 12a, thereby warranting the taking of higher resolution video streams with that imaging device 12a. Alternatively, if a user rarely reviews video streams from a particular imaging device 12a, low resolution videos may be acceptable to the user.

It can be understood that the AI algorithm stored in memory of server 58 allows the microprocessor of server 58 to analyze the data received from monitoring devices 12 and/or imaging devices 12a and from user device 16 to identify patterns, trends, correlations and/or clusters within such data to learn and make decisions without explicit programming, block 172. More specifically, it is intended for the AI algorithm to automatically identify and evaluate patterns and trends in the data received, namely, the triggering events, as well as, the raw audio and video streams and the user behavior patterns, to optimize the capture, storage and transmission of the audio and video streams, as heretofore described. Thereafter, the AI algorithm stored memory storage 48 of server 58 will cause instructions to be forwarded to corresponding monitoring devices 12 and/or imaging devices 12*a* regarding: 1) whether a current triggering event sensed by one or more monitoring devices 12 and/or imaging devices 12*a* provides a basis for recording an audio and/or video stream of the triggering event and generating an alert such as a push notification ("PN") to send to one or more monitoring devices 12 and/or imaging devices for the triggering event; 2) the length of the raw audio and video streams, the resolution of the video streams and/or the bit-rate or other characteristics of the video streams to be recorded by one or more monitoring devices 12 and/or imaging devices 12*a* based upon the volume and/or suddenness of the triggering event detected; 3) whether a future video stream should be recorded and the length of the video stream, the resolution of the video stream, and/or the bit-rate or other characteristics of the video stream to be recorded in response to the speed and direction of a moving object in an activity zone; and 4) the length of the future raw audio and video streams, the resolution of the future video streams and/or the bit-rate or other characteristics of the future video streams to be record by imaging device 12*a* if the objects and/or persons within the activity zone are known or unknown, block 174.

In addition, it is contemplated for the AI algorithm stored in memory server 58 to utilize the data received from one or more monitoring devices 12 and/or imaging devices 12*a* and user device 16 to automatically stitch the data together to optimize the data stored on server 58 and/or transmitted to user device 16, block 176. By way of example, the AI algorithm stored in memory of server 58 may stich together the raw audio and video streams captured by one or more imaging devices 12*a* to generate a single audio and video stream to optimize the length, resolution and contents thereof and to facilitate the storage and transmission thereof.

Accordingly, the invention provides a new and useful system that coordinates monitoring and the imaging devices of an electronic monitoring system in order to optimize and co-ordinate the video and audio taken by each of the imaging devices in response to a triggering event. The system and method of the present invention facilitates the recording of a length of video necessary to capture the entirety of the triggering event, without capturing unnecessary footage. Further, given the costs associated with the processing and storage of the video, the system and method of the present invention allows for only the capture and storage of video absolutely necessary.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic monitoring system for monitoring an environment, the electronic monitoring system, comprising:
   a plurality of monitoring devices configured to monitor at least one zone within the environment, each monitoring device selectively capturing a video stream of a corresponding monitored zone in response to corresponding triggering events, wherein each triggering event has data associated therewith;
   a plurality of controllers, each controller being associated with a corresponding monitoring device and including an AI algorithm and being configured to:
      receive the captured video stream and the data associated with each triggering event;
      automatically identify and evaluate patterns in the captured video stream received;
      modify at least one of a plurality of characteristics of a video stream to be captured at least partially in response to the identified patterns in previously received data; and
      share the data associated with each triggering event with the other of the plurality of controllers, the shared data received by each controller being utilized to automatically identify and evaluate patterns in the data associated with each triggering event and to modify at least one of the plurality of characteristics of the video stream to be captured.

2. The electronic monitoring system of claim 1, wherein:
   the at least one of a plurality of characteristics of the video stream to be captured is a length; and
   the length of the video stream to be captured is modified in response to the identified patterns.

3. The electronic monitoring system of claim 2, wherein the controller is configured to identify and evaluate the patterns in the data as a function of multiple video streams that were previously captured by the at least one monitoring device.

4. The electronic monitoring system of claim 3, wherein, when each video stream captured includes a moving object having a speed, the controller is configured to identify and evaluate the patterns in the data as a function of the speed of the moving object in the video streams previously captured by the at least one monitoring device.

5. The electronic monitoring system of claim 3, wherein when each captured video stream includes images of a moving object having a direction, the controller is configured to identify and evaluate the patterns in the data as a function of the direction of the moving object in the video streams previously captured by the at least one monitoring device.

6. The electronic monitoring system of claim 3, wherein when each captured video stream includes an object having one of a known identity and an unknown identity, the controller is configured to identify and evaluate the patterns in the data as a function of the identify of the object in the video streams previously captured by the at least one monitoring device.

7. An electronic monitoring system for monitoring an environment, the electronic monitoring system comprising:
   a plurality of monitoring devices configured to monitor at least one zone within the environment, each monitoring device selectively capturing video streams of a corresponding one of the at least one of monitored zones in response to corresponding triggering events, wherein each triggering event has data associated therewith;
   a plurality of controllers, each controller being associated with a corresponding monitoring device and including an AI algorithm and being configured to:
      receive the captured video streams from the corresponding monitoring device and the data associated with each triggering event;
      identify and evaluate patterns related to the captured video streams;

modify at least one of a plurality of characteristics of a video stream to be captured at least partially as a function of the captured video streams previously provided to the controller by the corresponding monitoring device; and share the data associated with each triggering event with the other of the plurality of controllers, the shared data received by each controller being utilized to identify and evaluate patterns in the data associated with each triggering event and to modify at least one of the plurality of characteristics of the video stream to be captured.

8. The electronic monitoring system of claim 7, wherein:

one of the at least one of a plurality of characteristics of the video stream to be captured is a length of the video stream; and the length of the video stream to be captured is modified as a function of the video stream previously provided to the controller by the corresponding monitoring device.

9. The electronic monitoring system of claim 8, wherein when the video stream captured includes a moving object having a speed, the controller is configured to identify and evaluate the patterns in the data as a function of the speed of the moving object in each video stream previously provided to the controller.

10. The electronic monitoring system of claim 8, wherein, when the video stream captured includes a moving object having a direction, the controller is configured to identify and evaluate the patterns in the video stream as a function of the direction of the moving object in each video stream previously provided to the controller.

11. The electronic monitoring system of claim 8, wherein, when each video stream captured includes an object having one of a known identity and an unknown identity, the controller is configured to identify and evaluate the patterns in the video stream as a function of the identify of the object in the video streams previously provided to the controller.

12. The electronic monitoring system of claim 7, further comprising a user device in communication with one of the plurality of monitoring devices and the controller associated therewith and being configured for viewing the captured video streams and transmitting data to the controller associated therewith relating to viewership of the captured video streams, wherein the controller associated therewith:

receives the data from the user device; and modifies at least one of the plurality of characteristics of the video stream to be captured at least partially as a function of the patterns in the data received from the user device.

13. A method for operating an electronic monitoring system, the method comprising:

monitoring a zone within the environment and selectively capturing a video stream in response to a detected triggering event;

providing data relating to the monitored zone and the detected triggering event;

automatically identifying and evaluate patterns in the data relating to the monitored zone;

modifying a characteristic of a plurality of characteristics of a video stream to be captured as a function of the data previously provided;

receiving data relating to triggering events detected by other devices monitoring the environment; and modifying at least one of the characteristics of a plurality of characteristics of the video stream to be captured as a function of the data received relating to the triggering events detected by the other devices.

14. The method of claim 13, wherein:

the characteristic of the video stream to be captured is at least one of a length, a resolution, and a bit-rate of the video stream; and at least one of the length, the resolution, and the bit-rate of the video stream to be captured is modified in response to the identified patterns.

15. The method of claim 14, wherein the data includes multiple triggering events that were previously detected.

16. The method of claim 14, wherein the data includes multiple video streams that were previously captured.

17. The method of claim 16, wherein when each previously captured video stream includes a moving object having a speed, the data includes the speed of the moving object in previously captured video streams.

18. The method of claim 16, wherein when each previously captured video stream includes a moving object having a direction, the data including the direction of the moving object in the previously captured video streams.

19. The method of claim 16, wherein when each previously captured video stream includes an object having one of a known identity and an unknown identity, the data including the identify of the object in the previously captured video streams.

* * * * *